United States Patent
Katayama et al.

(10) Patent No.: US 7,923,666 B2
(45) Date of Patent: Apr. 12, 2011

(54) PHASE CONTROL METHOD AND PHASE CONTROL DEVICE

(75) Inventors: Fumimasa Katayama, Muko (JP);
Takeshi Kishimoto, Hirakata (JP);
Takaaki Yamada, Kusatsu (JP)

(73) Assignee: Omron Corporation, Kyoto (JP)

( * ) Notice: Subject to any disclaimer, the term of this patent is extended or adjusted under 35 U.S.C. 154(b) by 437 days.

(21) Appl. No.: 12/098,757

(22) Filed: Apr. 7, 2008

(65) Prior Publication Data
US 2008/0252270 A1    Oct. 16, 2008

(30) Foreign Application Priority Data
Apr. 9, 2007  (JP) .................. 2007-101480

(51) Int. Cl.
*H05B 1/02* (2006.01)
(52) U.S. Cl. ....................... 219/497; 219/216
(58) Field of Classification Search .............. 323/212, 323/213, 282–285; 219/130.21, 130.31, 219/216, 497; 318/400.11, 400.13, 257, 318/599, 806, 811, 757; 363/165
See application file for complete search history.

(56) References Cited

U.S. PATENT DOCUMENTS

| 5,511,715 A | * | 4/1996 | Crutcher et al. | 227/131 |
| 5,994,671 A | * | 11/1999 | Suzuki et al. | 219/216 |

FOREIGN PATENT DOCUMENTS

| CN | 1156922 A | 8/1997 |
| JP | 61-049651 | 3/1986 |
| JP | 06-282337 | 10/1994 |
| JP | 10-312133 | 11/1998 |
| JP | 2001-265446 | 9/2001 |
| JP | 2003-009510 A | 10/2003 |
| JP | 2005-285103 | 10/2005 |

* cited by examiner

*Primary Examiner* — Rajnikant B Patel
(74) *Attorney, Agent, or Firm* — Foley & Lardner LLP

(57) ABSTRACT

A selectable operation amount is set as a threshold value according to an input operation amount, where if a determination value obtained by adding the input operation amount and an integrated operation amount or an output error accumulated value is greater than or equal to the threshold value, the threshold value is selected as the output operation amount, and if the determination value is not greater than or equal to the threshold value, a selectable output operation amount close to the threshold value is selected, and the ON/OFF control is performed with the selected output operation amount, while the selected output operation amount is subtracted from the determination value to correct the integrated operation amount, so that the input operation can be substantially output even if it takes an operation amount other than the selectable operation amount values.

4 Claims, 4 Drawing Sheets

PHASE CONTROL METHOD AND PHASE CONTROL DEVICE

This application claims priority from Japanese patent applications P2007-101480, filed on Apr. 9, 2007. The entire content of the aforementioned application is incorporated herein by reference.

BACKGROUND OF THE INVENTION

1. Field of the Invention

The present invention relates to a phase control method and a phase control device for phase controlling an alternating current (AC) power supply, and controlling the power to a load.

2. Description of the Related Art

Conventionally, phase control of controlling the phase angle at which the AC current flows and adjusting the power is adopted in the case of the AC load to control the power to the load such as a heater, and such phase control has an advantage of excelling in response of the control since power to the load is controlled by controlling the phase angle of a switching element for every half cycle of a power supply frequency (refer to, for example, Japanese Patent Application Laid-Open No. 06-282337).

SUMMARY OF THE INVENTION

In such phase control, the resolution of the control of the phase angle is defined according to the performance of a control circuit, and thus a high performance control circuit needs to be configured to enhance the resolution of the control of the phase angle, which arises a disadvantage of being expensive.

In view of the above, it is an object of the present invention to provide a phase control method and a phase control device capable of substantially enhancing the resolution of the control without requiring an expensive circuit configuration.

(1) A phase control method of the present invention relates to a phase control method for performing ON/OFF control of a switching unit arranged on a power supply line from an AC power supply to a load by a trigger signal of a phase angle corresponding to an output power command value based on an input power command value; the phase control method including the steps of selecting the output power command value from a plurality of selectable command values according to the input power command value and an accumulated value of an output error; performing the ON/OFF control by the trigger signal of a phase angle corresponding to the selected output power command value; and correcting the accumulated value of the output error according to the selected output power command value.

"Input power command value" refers to a command value provided to control the power to be supplied to the load, and includes an operation amount etc. provided from a controller, a PLC (Programmable Logic Controller), and the like, and takes a value between 0% and 100%, and the like.

"Output power command value" is a command value obtained based on the input power command value, where the phase angle of the trigger signal is controlled by the output power command value, and thus the selectable output power command value is limited by the resolution of the phase angle, and a plurality of command values is selected as the output power command value in a range of between 0% and 100%.

"Switching unit" refers to a unit for supplying and shielding power to the load by being turned ON/OFF, and is preferably configured by SSR without zero cross function, thyristor, and the like.

"Accumulated value of output error" refers to a value accumulating the output error or the difference between the input power command value and the output power command value that is actually output, that is, the difference between the input power command value and the selected output power command value.

The output power command value to be selected is preferably a selectable command value close to the input power command value so that the output error becomes small, where if the input power command value is a command value same as one of the plurality of selectable command values and the accumulated value of the output error does not exist, the relevant command value is selected as the output power command value.

The output power command value to be selected is preferably a command value smaller than the input power command value if the accumulated value of the output error is small, and is a command value larger than the input power command value if the accumulated value of the output error is large.

The processes of selecting the output power command value, performing ON/OFF control by the trigger signal of a phase angle corresponding to the selected output power command value, and correcting the accumulated value of the output error according to the selected output power command value are preferably performed in a predetermined period of half-cycle of the AC power supply.

As described above, the command value that can be selected as the output power command value is limited by the resolution of the phase angle, but according to the phase control method of the present invention, the output power command value is selected from a plurality of selectable command values according to the input power command value and the accumulated value of the output error stored up to the relevant point if the input power command value is not the plurality of selectable command values, the ON/OFF control is performed, and the accumulated value of the output error is corrected according to the selected output power command value, and thus even if the input power command value differs from the plurality of selectable command values and an output error is produced, such output error is accumulated, and the output power command value is selected so as to resolve the accumulated value of the output error in the subsequent cycle to correct the accumulated value of the output error.

Therefore, the input power command value can be substantially output even if it takes a command value other than the command value that can be selected as the output power command value, whereby the resolution of control can be substantially enhanced without using an expensive circuit.

(2) A phase control method of the present invention relates to a phase control method for performing ON/OFF control of a switching unit arranged on a power supply line from an AC power supply to a load by a trigger signal of a phase angle corresponding to an output power command value based on an input power command value; the phase control method including selection step of selecting the output power command value from a plurality of selectable command values according to the input power command value and an accumulated value of an output error; control step of performing the ON/OFF control by the trigger signal of a phase angle corresponding to the selected output power command value; and correction step of correcting the accumulated value of the output error according to the selected output power command value; wherein in the selection step, the selectable command value close to an added value obtained by adding the input power command value and the accumulated value of the output error is selected; and in the correction step, a difference between the added value and the selected output power command value is set as the accumulated value of the output error after correction.

According to the phase control method of the present invention, even if the input power command value differs from the command value that can be selected as the output power command value and an output error is produced, such output error is accumulated, and the output power command value is selected so as to resolve the accumulated value of the output error in the subsequent cycle to correct the accumulated value of the output error, and thus the input power command value can be substantially output even if it takes a command value other than the command value that can be output as the output power command value, and the resolution of control can be substantially enhanced without using an expensive circuit.

(3) A phase control method of the present invention relates to a phase control method for performing ON/OFF control of a switching unit arranged on a power supply line from an AC power supply to a load by a trigger signal of a phase angle corresponding to an output power command value based on an input power command value; the phase control method including threshold determination step of, when the input power command value is a command value different from a plurality of selectable command values, determining the selectable command value close to the input power command value as a threshold value, and when the input power command value is the same as one of the plurality of selectable command values, determining the command value as a threshold value; calculation step of calculating a determination value based on the input power command value and an accumulated value of an output error; selection step of, when the determination value is greater than or equal to the threshold value, selecting the threshold value as an output power command value, and when the determination value is not greater than or equal to the threshold value, selecting the selectable command value close to the threshold value as an output power command value; control step of performing the ON/OFF control by the trigger signal of a phase angle corresponding to the selected output power command value; and correction step of correcting the accumulated value of the output error based on the determination value and the selected output power command value.

According to the phase control method of the present invention, the selectable command value is set as a threshold value according to the input power command value, where the threshold value is selected as the output power command value if the determination value based on the input power command value and the output error accumulated value is greater than or equal to the threshold value and the selectable command value close to the threshold value is selected as an output power command value if the determination value is not greater than or equal to the threshold value, and the ON/OFF control is performed with the selected output power command value, while the accumulated value of the output error is corrected, and thus the input power command value can be substantially output even if it takes a command value other than the command values that can be selected as the output power command value, and the resolution of control can be substantially enhanced without using an expensive circuit.

(4) In one embodiment of the phase control method of the present invention, the selectable command value close to the input power command value in the threshold determination step is a command value greater than and closest to the input power command value; and the selectable command value close to the threshold value in the selection step is a command value smaller than and closest to the threshold value.

According to the present embodiment, a selectable command value greater than and closest to the input power command value is selected as the threshold value if the input power command value is not the command value that can be selected as the output power command value, and a selectable command value smaller than and closest to the threshold value is selected as the output power command value if the determination value based on the input power command value and the output error accumulated value is not greater than or equal to the threshold value, and thus the output power command value smaller than the input power command value is selected and the output error is accumulated if the accumulated value of the output error is small and the determination value is not greater than or equal to the threshold value, and the output power command value greater than the input power command value is selected and operates to resolve the accumulated value of the output error if the accumulated value becomes larger and the determination value becomes greater than or equal to the threshold value.

(5) A phase control device of the present invention relates to a phase control device for performing ON/OFF control of a switching unit arranged on a power supply line from an AC power supply to a load by a trigger signal of a phase angle corresponding to an output power command value based on an input power command value; the phase control device including a selecting unit for selecting the output power command value from a plurality of selectable command values according to the input power command value and an accumulated value of an output error; a control unit for performing the ON/OFF control by the trigger signal of a phase angle corresponding to the selected output power command value; and a correcting unit for correcting the accumulated value of the output error according to the selected output power command value.

According to the phase control device of the present invention, even if the input power command value differs from the command value that can be selected as the output power command value and an output error is produced, such output error is accumulated, and the output power command value is selected so as to resolve the accumulated value of the output error in the subsequent cycle to correct the accumulated value of the output error, and thus the input power command value can be substantially output even if it takes a command value other than the command value that can be selected as the output power command value, and the resolution of control can be substantially enhanced without using an expensive circuit.

(6) In one embodiment of the phase control device of the present invention, the selecting unit selects the selectable command value close to an added value obtained by adding the input power command value and the accumulated value of the output error as the output power command value; and the correcting unit sets a difference between the added value and the selected output power command value as the accumulated value of the output error after correction.

According to the present embodiment, since the selectable command value close to an added value obtained by adding the input power command value and the accumulated value of the output error is selected as the output power command value in the selecting unit, the output power command value smaller than the input power command value and close to the input power command value is selected if the accumulated value of the output error is small, and the output power command value greater than the input power command value and close to the input power command value is selected if the accumulated value of the output error becomes large, so that a small output power command value is selected and the output error is accumulated when the accumulated value of the output error is small, and a large output power command value is selected and the accumulated value of the output error is resolved when the accumulated value becomes large.

(7) A phase control device of the present invention relates to a phase control device for performing ON/OFF control of a switching unit arranged on a power supply line from an AC power supply to a load by a trigger signal of a phase angle corresponding to an output power command value based on an input power command value; the phase control device including a threshold determining unit of, when the input power command value is a command value different from a plurality of selectable command values, determining the selectable command value close to the input power command value as a threshold value, and when the input power command value is the same as one of the plurality of selectable command values, determining the command value as a threshold value; a calculating unit for calculating a determination value based on the input power command value and an accumulated value of an output error; a selecting unit for, when the determination value is greater than or equal to the threshold value, selecting the threshold value as an output power command value, and when the determination value is not greater than or equal to the threshold value, selecting the selectable command value close to the threshold value as an output power command value; a control unit for performing the ON/OFF control by the trigger signal of a phase angle corresponding to the selected output power command value; and a correcting unit for correcting the accumulated value of the output error based on the determination value and the selected output power command value.

According to the phase control device of the present invention, even if the input power command value differs from the command value that can be selected as the output power command value and an output error is produced, such output error is accumulated, and the output power command value is selected so as to resolve the accumulated value of the output error in the subsequent cycle to correct the accumulated value of the output error, and thus the input power command value can be substantially output even if it takes a command value other than the command value that can be selected as the output power command value, and the resolution of control can be substantially enhanced without using an expensive circuit.

(8) In one embodiment of the phase control device of the present invention, the selectable command value close to the input power command value in the threshold determining unit is a command value greater than and closest to the input power command value; and the selectable command value close to the threshold value in the selecting unit is a command value smaller than and closest to the threshold value.

According to the present embodiment, a selectable command value smaller than and closest to the threshold value is selected as the output power command value if the accumulated value of the output error is small and determination value is not greater than or equal to a threshold value, the threshold value being a selectable command value greater than and closest to the input power command value, where a small output power command value is selected and the output error is accumulated if the accumulated value of the output error is small and the determination value is not greater than or equal to the threshold value, and a large output power command value is selected and operates to resolve the accumulated value of the output error if the accumulated value becomes larger and the determination value becomes greater than or equal to the threshold value.

According to the present invention, the input power command value can be substantially output even if it takes a command value other than the command values that can be selected as the output power command value, and the resolution of control can be substantially enhanced without using an expensive circuit.

DETAILED DESCRIPTION OF THE PREFERRED EMBODIMENTS

An embodiment of the present invention will be described in detail with reference to the drawings.

Figure 1:
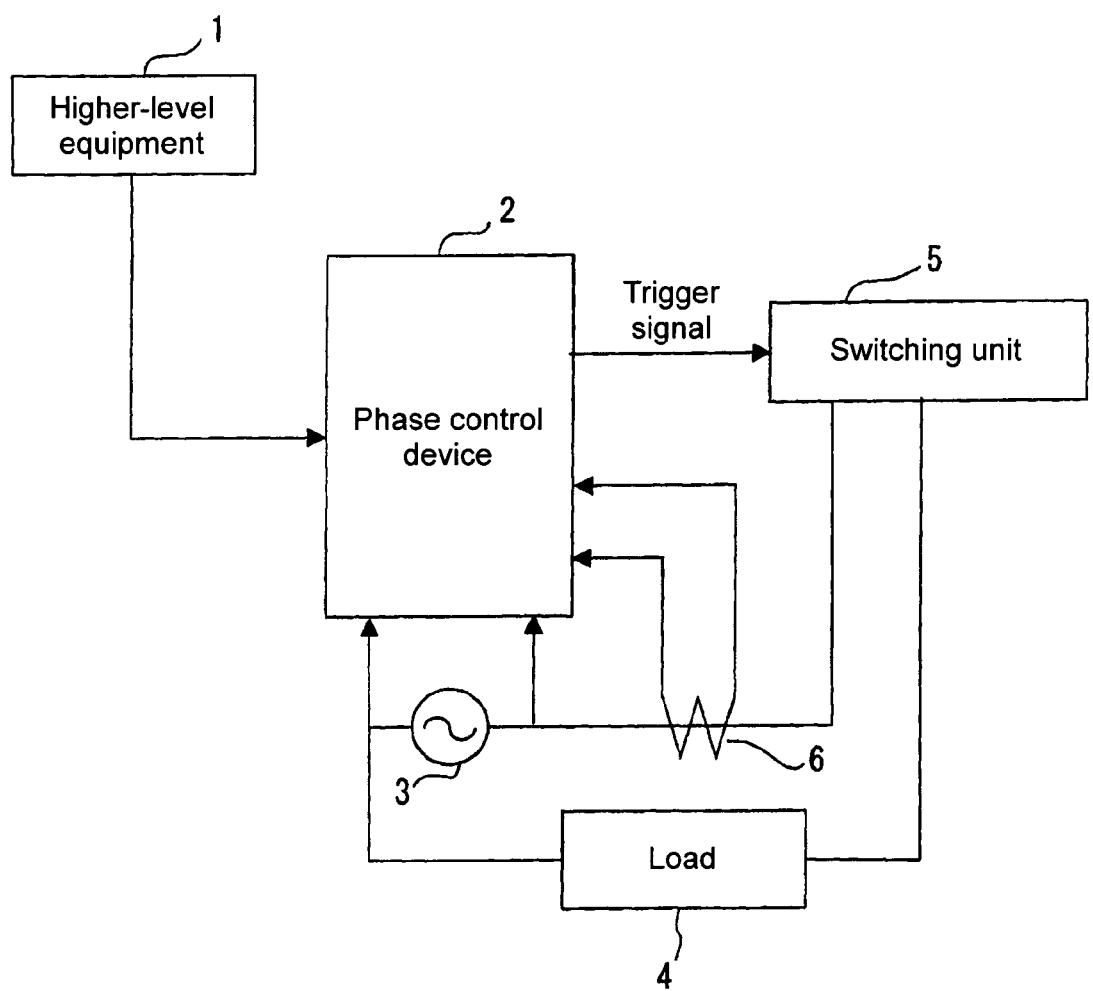
FIG. 1 shows a schematic configuration view of a system equipped with a phase control device according to the present invention.

FIG. 1 shows a block diagram showing a schematic configuration of a system equipped with a power control device according to one embodiment of the present invention.

The system includes, a higher-level equipment 1 such as a temperature adjustment unit, PLC (Programmable Logic Controller) or PC (Personal Computer); a phase control device 2 according to the present invention; a switching unit 5 such as SSR, arranged between a load power supply 3 of alternating current and a load 4 such as a heater, ON/OFF controlled by a trigger signal from the phase control device 2; and a current detector (CT) 6 for detecting current flowing through a load 4.

The phase control device 2 of the present embodiment detects a zero cross timing of the load power supply 3, generates the trigger signal of a phase angle corresponding to an output power command value (output operation amount) based on an input power command value (input operation amount) provided from the higher-level equipment 1 to perform ON/OFF control of the switching unit 5, and outputs an alarm when detecting abnormality of overcurrent, heater disconnection, or the like based on the output of the current detector 6.

The switching unit 5 is configured by an SSR (Solid State Relay) without zero cross function, and performs supply and shield of power with respect to the load 3 by being ON/OFF controlled by the trigger signal from the phase control device 2.

Figure 2:
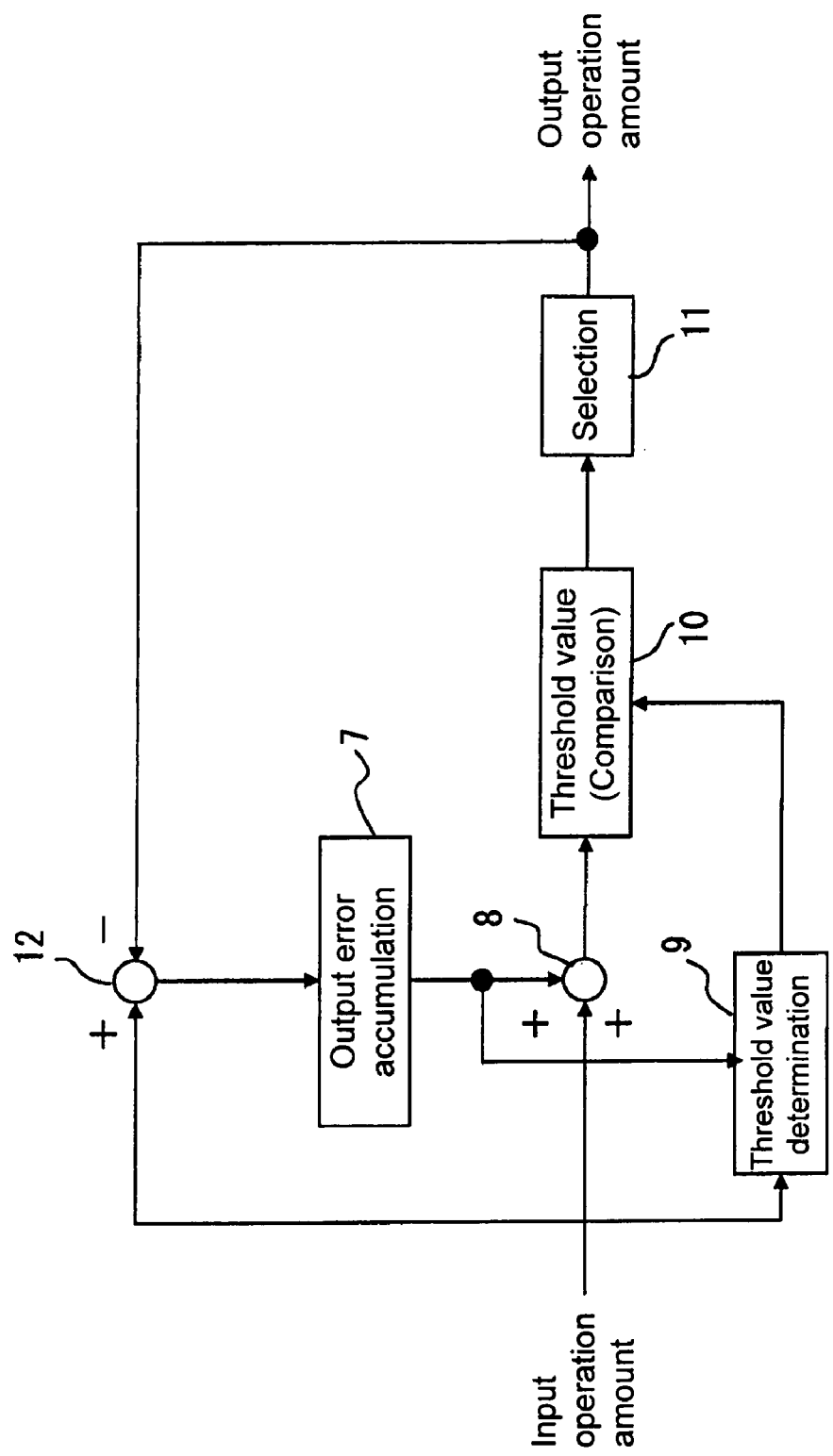
FIG. 2 shows a block diagram of the main parts of the phase control device of FIG. 1.

FIG. 2 shows a block diagram of the main parts of the phase control device 2 of FIG. 1.

The phase control device 2 generates the output operation amount or the output power command value based on the input operation amount or the input power command value of between 0% and 100% provided from the higher-level equipment 1, where the output operation can only select the operation amount shown in table 1, that is, the operation amount of 0%, 1%, 2%, 5%, 10%, 20%, 30%, 40%, 50%, 60%, 70%, 80%, 90%, and 100% due to restriction on the resolution of the control of the phase angle.

TABLE 1

| Operation amount | 0% | 1% | 2% | 5% | 10% | 20% | 30% | 40% | 50% | 60% | 70% | 80% | 90% | 100% |
|---|---|---|---|---|---|---|---|---|---|---|---|---|---|---|
| | | | | | | | | | | | | | | |

In the present embodiment, even if the input operation amount is an operation amount other than the selectable operation amount of table 1, the process described below is performed to output the operation amount, so that the input operation amount can be substantially output even if not the selectable operation amount.

Thus, the phase control device 2 of the present embodiment includes an adder 8 for adding the input operation amount and an output error accumulated up to the relevant point from an output error accumulating unit 7 and obtaining a determination value; a threshold value determining unit 9 for determining a threshold value based on the input operation amount and the accumulated output error; a comparator 10 for comparing the determination value and the threshold value; a selection unit 11 for selecting the output operation amount from a plurality of selectable output operation amounts according to the comparison result; and a subtraction unit 12 for subtracting the selected output operation amount from the input operation amount and correcting the output error; where the trigger signal of the phase corresponding to the selected output operation amount is generated in a trigger signal generation unit (not shown) and output to the switching unit 5.

The above configuration is realized by a microcomputer and the like, where the zero cross timing of the load power supply 3 is detected and the phase control is performed by the microcomputer.

Figure 3:
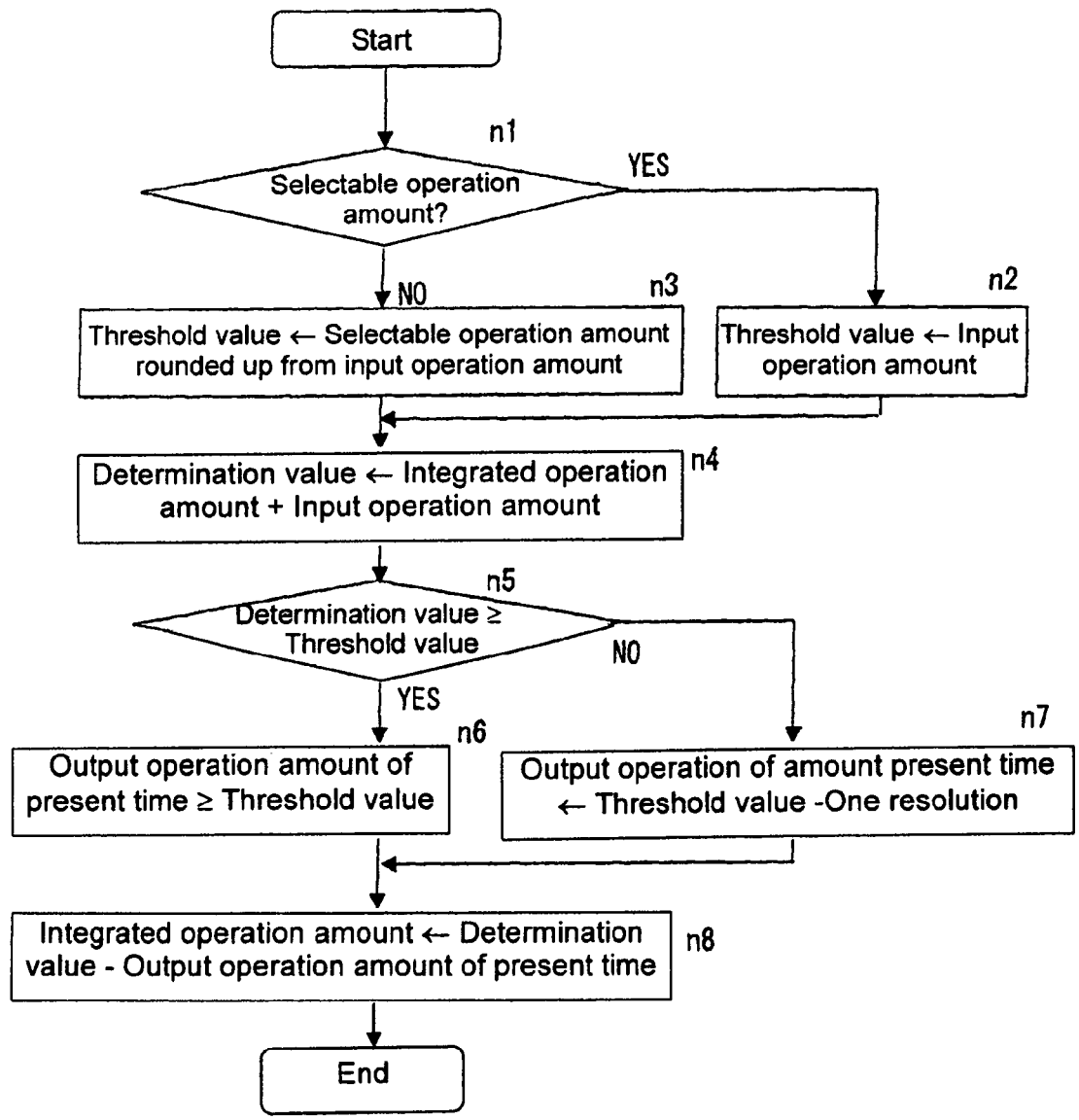
FIG. 3 shows a flowchart providing a description of an operation.

The operation of the embodiment will now be described in detail based on a flowchart of FIG. 3.

First, a threshold value is determined based on the input operation amount of the present time and the selectable operation amount of table 1. In other words, whether or not the input operation amount of the present time is the selectable operation amount of table 1 is determined (step n1), and if the input operation amount is the selectable operation amount, such operation amount is set as the threshold value (step n2). If the input operation amount is not the selectable operation amount, the input operation amount is rounded up, and the selectable operation amount of table 1 closest to the relevant input operation amount is set as the threshold value (step n3). When the input operation amount is not the selectable operation amount of table 1, for instance, if the input operation amount is 11%, the input operation amount is rounded up, and 20%, which is the selectable closest operation amount is set as the threshold value. Furthermore, if the input operation amount is 25%, the input operation amount is rounded up, and 30% which is the selectable closest operation amount is set as the threshold value.

Next, an integrated operation amount or the accumulated value of the output error and the input operation amount are added to obtain a determination value (step n4), and whether or not the determination value is greater than or equal to the threshold value is determined (step n5), where if the determination value is greater than or equal to the threshold value, the threshold value is selected as an output operation amount of the present time, and the ON/OFF of the switching unit 5 is controlled by the trigger signal of a phase corresponding to the selected output operation amount (step n6).

If the determination value is not greater than or equal to the threshold value in step n5, the operation amount lowered from the threshold value by one resolution in table 1 is selected as the output operation amount of the present time, and the ON/OFF of the switching unit 5 is controlled by the trigger signal of a phase corresponding to the selected output operation amount (step n7).

For instance, if the threshold value is 20%, 10%, which is the operation amount lower by one resolution (one stage) from the operation amount 20% of table 1, is set as the output operation amount of the present time; and if the threshold value is 30%, 20%, which is the operation amount lower by one resolution from the operation amount 30% of table 1, is set as the output operation amount of the present time. Thereafter, a value obtained by subtracting the output operation amount of the present time from the determination value is set as a new integrated operation amount (step n8).

In the present embodiment, the above processes are performed for every half cycle of the power supply frequency.

Figure 4:
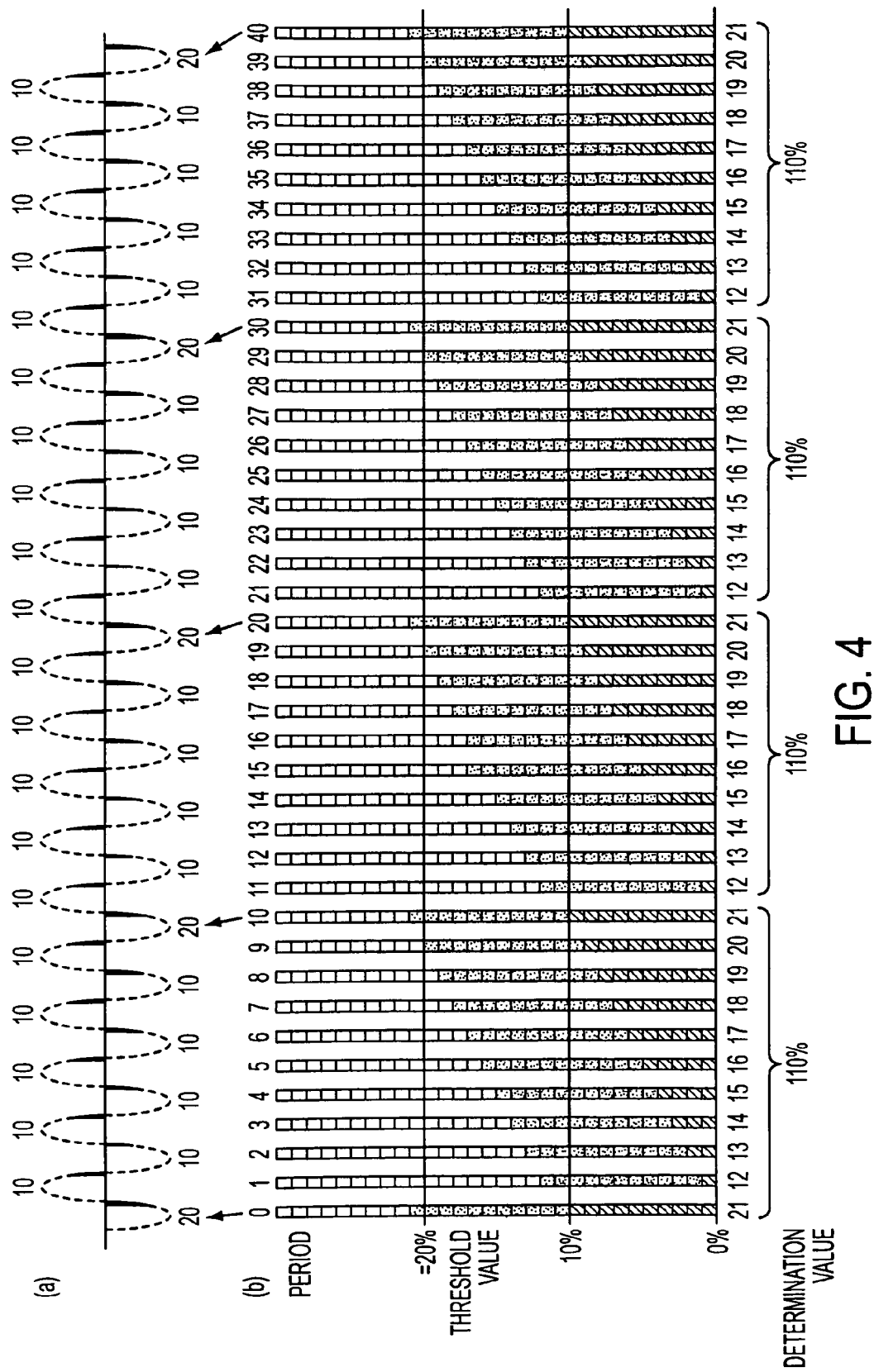
FIG. 4 shows a view showing an output waveform and a change in determination value of when the input operation amount is 11%.

FIG. 4 shows an example in which the input operation amount is 11%, where FIG. 4A shows an output waveform, and FIG. 4B shows change in the determination value, which is the sum of the input operation amount and the integrated operation amount (accumulated value of the output error).

The description will be made in a first period second from the left of FIG. 4.

First, the threshold value is determined, but since the input operation amount 11% is not the selectable operation amount of table 1, the input operation amount 11% is rounded up, and 20% which is the closest selectable operation amount is set as the threshold value.

The input operation amount 11% and the integrated operation amount are added, and the determination value is obtained. In a $0^{th}$ period at the left end of FIG. 4, the output operation amount of 20% is selected and output with respect to the determination value of 21%, and thus the integrated operation amount or the accumulated value of the output error is 1%. Therefore, the determination value in the first period becomes 12%, which is obtained by adding the input operation amount 11% and the integrated operation amount 1%. Since the determination value 12% is smaller than the threshold value 20%, 10%, which is the selectable operation amount lower by one resolution from the threshold value 20%, is selected as the output operation amount of the present time, ON/OFF of the switching unit 5 is controlled by the trigger signal of the phase corresponding to the selected output operation amount 10%, the operation amount 10% of the present time is subtracted from the determination value 12% to correct the integrated operation amount, and the process is terminated with a subtracted value 2% as the integrated operation amount.

In the next second period, the input operation amount is 11%, and thus the threshold value is 20%, similar to the first period.

The input operation amount 11% and the integrated operation amount 2% are added, and the determination value 13% is obtained. Since the determination value 13% is smaller than the threshold value 20%, 10%, which is the selectable operation amount lower by one resolution from the threshold value 20%, is selected as the output operation amount of the present time, ON/OFF of the switching unit 5 is controlled by the trigger signal of the phase corresponding to the selected output operation amount 10%, and the process is terminated with a value 3% obtained by subtracting the operation amount 10% of the present time from the determination value 13% as the integrated operation amount.

The integrated operation amount (accumulated value of output error) is increased by 1% through a similar process of every half cycle.

In the tenth period, the input operation amount is 11%, and thus the threshold value is 20%, similar to the above.

The input operation amount 11% and the integrated operation amount 10% are added, and the determination value 21% is obtained. Since the determination value 21% is larger than the threshold value 20%, the threshold value 20 is selected as the output operation amount of the present time, and ON/OFF of the switching unit 5 is controlled by the trigger signal of the phase corresponding to the selected output operation amount 20%, and the process is terminated with a value 1% obtained by subtracting the operation amount 20% of the present time from the determination value 21% as the integrated operation amount.

Through the similar process, the output operation amount of 110% is output in ten periods, and thus on average, the output operation amount is 11% in one period.

Therefore, even if the input operation amount 11% is not the selectable operation amount, the output operation amount of 11% can be substantially output.

A control circuit is thus configured using a relatively inexpensive microcomputer etc., and even if the resolution of the control of the phase angle is restricted and the selectable operation amount is limited, the output operation amount that cannot be selected can be substantially output, and the resolution of the control can be substantially enhanced without using an expensive and high performance control circuit.

In a case of a plurality of channels, the process merely needs to be performed for every channel.

The present invention is useful in the control of power to the load.

What is claimed is:

1. A phase control method for performing ON/OFF control of a switching unit arranged on a power supply line from an AC power supply to a load by a trigger signal of a phase angle corresponding to an output power command value based on an input power command value, the phase control method comprising:
   a threshold determination step of, when the input power command value is a command value different from a plurality of selectable command values, rounding up the input power command value and determining the selectable command value closest to the rounded input power command value as a threshold value, and when the input power command value is the same as one of the plurality of selectable command values, determining the command value as a threshold value;
   a calculation step of calculating a determination value based on the input power command value and an accumulated value of an output error;
   a selection step of, when the determination value is greater than or equal to the threshold value, selecting the threshold value as an output power command value, and when the determination value is not greater than or equal to the threshold value, selecting the selectable command value lowered from the threshold value by a resolution stage as an output power command value;
   a control step of performing the ON/OFF control by the trigger signal of a phase angle corresponding to the selected output power command value; and
   a correction step of correcting the accumulated value of the output error based on the determination value and the selected output power command value.

2. The phase control method according to claim 1, wherein
   the selectable command value closest to the rounded input power command value in the threshold determination step is a command value greater than and closest to the input power command value; and
   the selectable command value lowered from the threshold value in the selection step is a command value smaller than and closest to the threshold value.

3. A phase control device for performing ON/OFF control of a switching unit arranged on a power supply line from an AC power supply to a load by a trigger signal of a phase angle corresponding to an output power command value based on an input power command value, the phase control device comprising:
   a threshold determining unit of, when the input power command value is a command value different from a plurality of selectable command values, rounding up the input power command value and determining the selectable command value closest to the rounded input power command value as a threshold value, and when the input power command value is the same as one of the plurality of selectable command values, determining the command value as a threshold value;
   a calculating unit for calculating a determination value based on the input power command value and an accumulated value of an output error;
   a selecting unit for, when the determination value is greater than or equal to the threshold value, selecting the threshold value as an output power command value, and when the determination value is not greater than or equal to the threshold value, selecting the selectable command value lowered from the threshold value by a resolution stage as an output power command value;
   a control unit for performing the ON/OFF control by the trigger signal of a phase angle corresponding to the selected output power command value; and
   a correcting unit for correcting the accumulated value of the output error based on the determination value and the selected output power command value.

4. The phase control device according to claim 3, wherein
   the selectable command value closest to the rounded input power command value in the threshold determining unit is a command value greater than and closest to the input power command value; and
   the selectable command value close to lowered from the threshold value in the selecting unit is a command value smaller than and closest to the threshold value.

* * * * *